US012633609B2

(12) United States Patent
Ochi

(10) Patent No.: US 12,633,609 B2
(45) Date of Patent: May 19, 2026

(54) ELECTRONIC DEVICE

(71) Applicant: EAGLE INDUSTRY CO., LTD.,
Tokyo (JP)

(72) Inventor: Satoshi Ochi, Tokyo (JP)

(73) Assignee: EAGLE INDUSTRY CO., LTD.,
Tokyo (JP)

( * ) Notice: Subject to any disclaimer, the term of this
patent is extended or adjusted under 35
U.S.C. 154(b) by 557 days.

(21) Appl. No.: 18/018,505

(22) PCT Filed: Aug. 6, 2021

(86) PCT No.: PCT/JP2021/029353
§ 371 (c)(1),
(2) Date: Jan. 27, 2023

(87) PCT Pub. No.: WO2022/030625
PCT Pub. Date: Feb. 10, 2022

(65) Prior Publication Data
US 2024/0039104 A1 Feb. 1, 2024

(30) Foreign Application Priority Data
Aug. 7, 2020 (JP) ................................. 2020-134655

(51) Int. Cl.
*H01M 50/262* (2021.01)
*H01M 50/216* (2021.01)
(Continued)

(52) U.S. Cl.
CPC ....... *H01M 50/262* (2021.01); *H01M 50/216*
(2021.01); *H01M 50/256* (2021.01); *H01M*
*50/284* (2021.01); *H01M 50/296* (2021.01)

(58) Field of Classification Search
CPC ............. H01M 50/262; H01M 50/296; H01M
50/256; H01M 50/216
See application file for complete search history.

(56) References Cited

U.S. PATENT DOCUMENTS 4,206,274 A 6/1980 Peels ....................... H01M 2/10
4,828,944 A 5/1989 Yabe et al.
(Continued)

FOREIGN PATENT DOCUMENTS

CN 203762298 U 8/2014
JP 49C06417 1/1974 ............. H01M 2/10
(Continued)

OTHER PUBLICATIONS

Machine Translation of: Matsui et al. (JP 07-335186 A), Dec.
1995.*
(Continued)

*Primary Examiner* — Kenneth J Douyette
(74) *Attorney, Agent, or Firm* — HAYES SOLOWAY P.C.

(57) ABSTRACT

An electronic device includes a housing and a battery holder
configured for holding a battery and removably inserted into
the housing. A positive terminal and a negative terminal on
the side of the battery holder are arranged side by side and
a positive terminal and a negative terminal on the side of the
housing are arranged side by side. The housing and the
battery holder are provided with either a recessed groove
extending in an insertion direction in which the battery
holder is inserted into the housing or a protrusion extending
in the insertion direction, and the recessed groove and the
protrusion constitute a guide portion.

11 Claims, 12 Drawing Sheets

(51) Int. Cl.
    H01M 50/256     (2021.01)
    H01M 50/284     (2021.01)
    H01M 50/296     (2021.01)

(56)          References Cited

U.S. PATENT DOCUMENTS

| | | | | |
|---|---|---|---|---|
| 5,075,182 | A | * 12/1991 | Weber | G06F 1/18 |
| | | | | 429/96 |
| 5,612,147 | A | 3/1997 | Nagata | |
| 5,626,979 | A | 5/1997 | Mitsui et al. | H01M 2/02 |
| 5,868,790 | A | 2/1999 | Vincent et al. | |
| 11,950,636 | B2 | 4/2024 | Qiu et al. | |
| 2004/0016455 | A1 | 1/2004 | Oogami | |
| 2006/0134513 | A1 | 6/2006 | Tsumura et al. | |
| 2008/0253066 | A1 | 10/2008 | Tracy et al. | |
| 2013/0136971 | A1 | 5/2013 | Igarashi | |
| 2014/0162114 | A1 | 6/2014 | Suzuki | |
| 2014/0363716 | A1 | 12/2014 | Nishida et al. | |
| 2017/0084891 | A1 | 3/2017 | Lu et al. | |
| 2019/0261690 | A1 | 8/2019 | Lin et al. | |
| 2020/0038285 | A1 | 2/2020 | Bauer | |
| 2021/0083348 | A1 | 3/2021 | Akasawa | |

FOREIGN PATENT DOCUMENTS

| | | | | |
|---|---|---|---|---|
| JP | 54C91729 | 7/1979 | | H01M 2/10 |
| JP | 570C4163 | 1/1982 | | H01M 2/10 |
| JP | 2148558 | 11/1992 | | H01M 2/10 |
| JP | 4123065 | 11/1992 | | H01M 2/10 |
| JP | 7335186 | 12/1995 | | H01M 2/10 |
| JP | H804549 C | 2/1996 | | H01M 2/10 |
| JP | 200176695 | 3/2001 | | H01M 2/10 |
| JP | 2001305623 | 11/2001 | | G03B 17/02 |
| JP | 2013-242967 A2 | 12/2013 | | |
| JP | 201996489 | 6/2019 | | F21L 4/00 |
| JP | 2019153485 | 9/2019 | | H01M 2/10 |
| JP | 2019537431 | 12/2019 | | A01C 11/00 |
| WO | WO2019198279 A1 | 10/2019 | | |

OTHER PUBLICATIONS

Extended European Search Report issued in EP Patent Appln. Serial No. 21854304.9, dated Nov. 15, 2024, 8 pages.
International Search Report, Written Opinion and International Preliminary Report on Patentability issued in related PCT International Patent Application Serial No. PCT/JP2021/029353, dated Oct. 19, 2021, 20 pages.
International Search Report, Written Opinion and International Preliminary Report on Patentability issued in related PCT International Patent Application Serial No. PCT/JP2021/029352, dated Oct. 19, 2021, 20 pages.

* cited by examiner

ELECTRONIC DEVICE

TECHNICAL FIELD

The present invention relates to a battery-powered electronic device.

BACKGROUND ART

A battery-powered electronic device requires no connection to an external power source, so that it can be used anywhere.

For example, a sensor device described in Patent Citation 1 is an electronic device that senses the state of a manufacturing device installed on a manufacturing line, and includes a button cell as a power source. Further, a battery holder holding the button cell can extend through a slit-shaped insertion portion of a housing to supply the sensor device with power. The battery holder is configured such that a first terminal and a second terminal in contact with a positive electrode and a negative electrode of the button cell, respectively, a processing circuit processing the output of a sensor element, a communication circuit communicating with the outside, and a connector configured to be electrically connected to the sensor element, or the like are mounted on a support substrate. The battery holder holds the button cell and extends through the insertion portion of the housing to electrically connect a terminal of the sensor element fixed in the housing with a connector of the battery holder.

Further, in the battery holder, the support substrate has such a longitudinal dimension that with one end of the support substrate in the longitudinal direction being in contact with the bottom portion of the housing, the other end portion of the support substrate in the longitudinal direction projects from an opening of the housing. Further, the opening of the housing is closed by a lid including locking claws. A slit-shaped recess is formed on the inner surface of the lid, and the other end of the support substrate in the longitudinal direction is in contact with the bottom portion of the recess in the lid to support the battery holder and to maintain the electrical connection.

CITATION LIST

Patent Literature

Patent Citation 1: JP 2019-153485 A (Pages 8 and 9, FIG. 6)

SUMMARY OF INVENTION

Technical Problem

However, in the sensor device of Patent Citation 1, the battery holder is configured such that the support substrate is inserted until one end thereof in the longitudinal direction is brought into contact with the bottom portion of the housing with the opposite ends of the support substrate in a lateral direction brought into sliding contact with an inner wall of the insertion portion of the housing. Therefore, if the support substrate is inserted into the insertion portion of the housing while being tilted in the thickness direction, a misalignment of the terminal of the sensor element and the connector of the battery holder may be produced, resulting in poor connection.

The present invention has been made in view of such problems, and an object of the present invention is to provide an electronic device in which electrode terminals can be accurately connected to each other.

Solution to Problem

In order to solve the problem described above, an electronic device according to the present invention is an electronic device including a housing and a battery holder configured for holding a battery and removably inserted into the housing, the electronic device further including a positive terminal and a negative terminal on a side of the battery holder and including another positive terminal and another negative terminal on a side of the housing, wherein the positive terminal and the negative terminal on the side of the battery holder are arranged side by side, the positive terminal and the negative terminal on the side of the housing are arranged side by side, the housing and the battery holder are provided with either a recessed groove extending in an insertion direction in which the battery holder is inserted into the housing or a protrusion extending in the insertion direction, and the recessed groove and the protrusion constitute a guide portion. According to the aforementioned feature of the present invention, the guide portion is constituted by the recessed groove and the protrusion extending in the insertion direction of the battery holder, and can prevent the inclination of the battery holder which is inserted into and removed from the housing. Accordingly, the positive and negative terminals on the side of the battery holder and the positive and negative terminals can be accurately connected to each other.

It may be preferable that another guide portion is provided, and the guide portions are arranged so as to face each other. According to this preferable configuration, since the guide portions are arranged so as to face each other, the inclination of the battery holder that is inserted into and removed from the housing can be further prevented.

It may be preferable that the housing includes an outer case and an inner case arranged inside the outer case and provided with the guide portion, and a circuit board of the electronic device is be fixed to an outer surface of the inner case. According to this preferable configuration, the circuit board is protected by the inner case, so that it can be not directly affected by the impact from the outside of the outer case or the insertion and removal of the battery holder.

It may be preferable that the inner case is provided with through holes passing through the inner case in the insertion direction of the battery holder, and the positive terminal and the negative terminal on the side of the housing are protruded through the through holes. According to this preferable configuration, the battery holder is in contact with the inner case, so that the positive terminal and the negative terminal on the battery holder side can be prevented from being pressed against the positive terminal and the negative terminal of the housing side by an excessive force.

It may be preferable that a positioning mechanism is provided between the inner case and the battery holder, and the positioning mechanism is configured to define progress of insertion of the battery holder. According to this preferable configuration, the positive terminal and the negative terminal on the battery holder side can be in contact with the positive terminal and the negative terminal of the housing side with an appropriate force.

It may be preferable that the positioning mechanism is performed by recess-protrusion fitting of a recess and a protrusion between the inner case and the battery holder. According to this preferable configuration, the battery holder can be locked by the recess-protrusion fitting of the recess and the protrusion with the positive electrode and the negative electrode of the battery held by the battery holder being in contact with the positive terminal and the negative terminal on the housing side.

It may be preferable that the battery holder is provided with a handle. According to this preferable configuration, the handle is used to remove the battery holder, facilitating drawing the battery holder from the electronic device.

It may be preferable that the housing includes an outer case and an inner case arranged inside the outer case and provided with the guide portion, and a gap adjusting member regulating a gap between the inner case and the outer case is provided. According to this preferable configuration, the gap between the inner case and the outer case is adjusted, so that the battery holder and the inner case are less likely to rattle with respect to the outer case in the assembled state.

Additionally, when the gap adjusting member is composed of, for example, an elastic member and is in pressure contact in a direction of the gap between the inner case and the outer case, the effect of preventing rattling is further improved. In addition, when the gap adjusting member is provided at the rear of the inner case in the direction of insertion, the inner case can be easily inserted into and removed from the outer case.

BRIEF DESCRIPTION OF DRAWINGS

FIG. 4 illustrates a state in which an outer case is removed.

FIG. 5 illustrates a state in which the outer case is removed.

FIG. 8 illustrates the configuration of a circuit unit and the like partially omitted.

FIG. 9 illustrates the configuration of a circuit unit and the like partially omitted.

FIG. 10 illustrates the configuration of a circuit unit and the like partially omitted.

DESCRIPTION OF EMBODIMENTS

Figure 1:
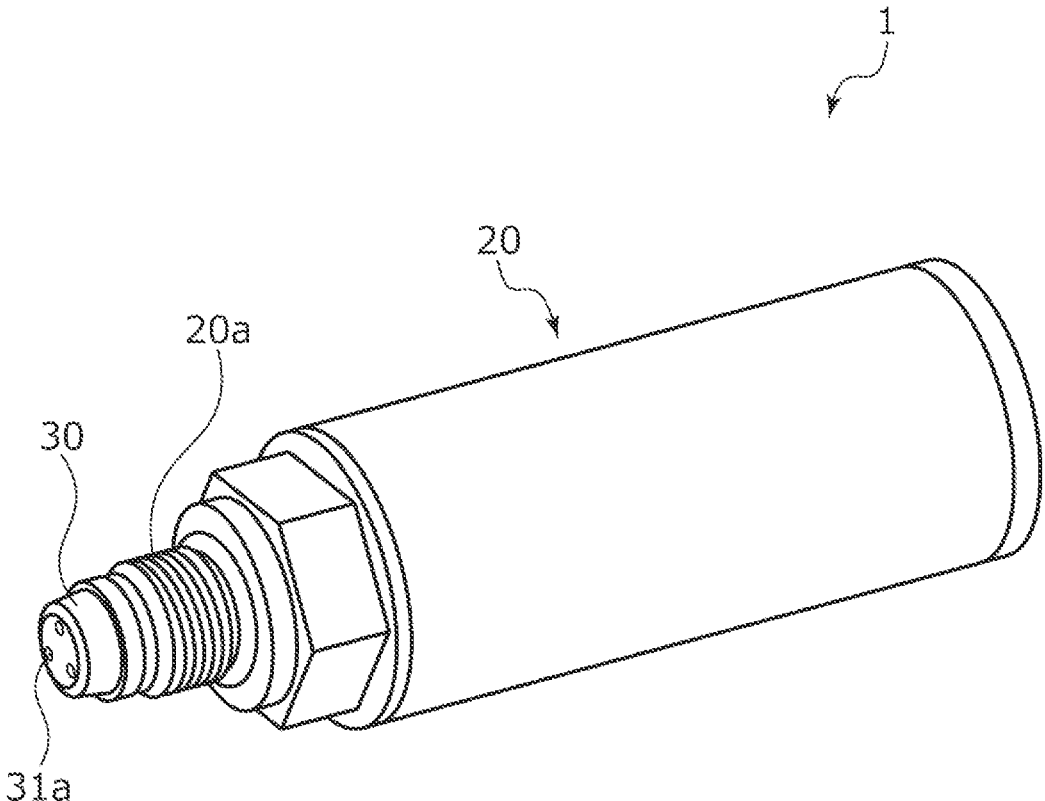
FIG. 1 is a perspective view illustrating a pressure sensor as an electronic device according to a first embodiment of the present invention.

Modes for carrying out an electronic device according to the present invention will be described below based on embodiments.

First Embodiment

An electronic device according to a first embodiment of the present invention will be described with reference to FIGS. 1 to 7. Hereinafter, the left and right sides when viewed from the front side of FIG. 3 will be described as the left and right sides of the electronic device. Specifically, the left side of the drawing on which a sensor unit 30 is provided will be described as the left side of the electronic device, and the right side of the drawing on which a cap member 23 is attached will be described as the right side of the electronic device.

As illustrated in FIG. 1, the electronic device according to the first embodiment of the present invention is a pressure sensor 1 configured to detect the pressure of an object to be measured and including a battery 10 (see FIG. 2) as a power source. The pressure sensor 1 is fixed to an installed portion such as a pipe, a duct, or a tank (not illustrated), and detects the pressure of the object to be measured inside the installed portion. The object to be measured is a fluid such as a liquid or a gas.

Figure 2:
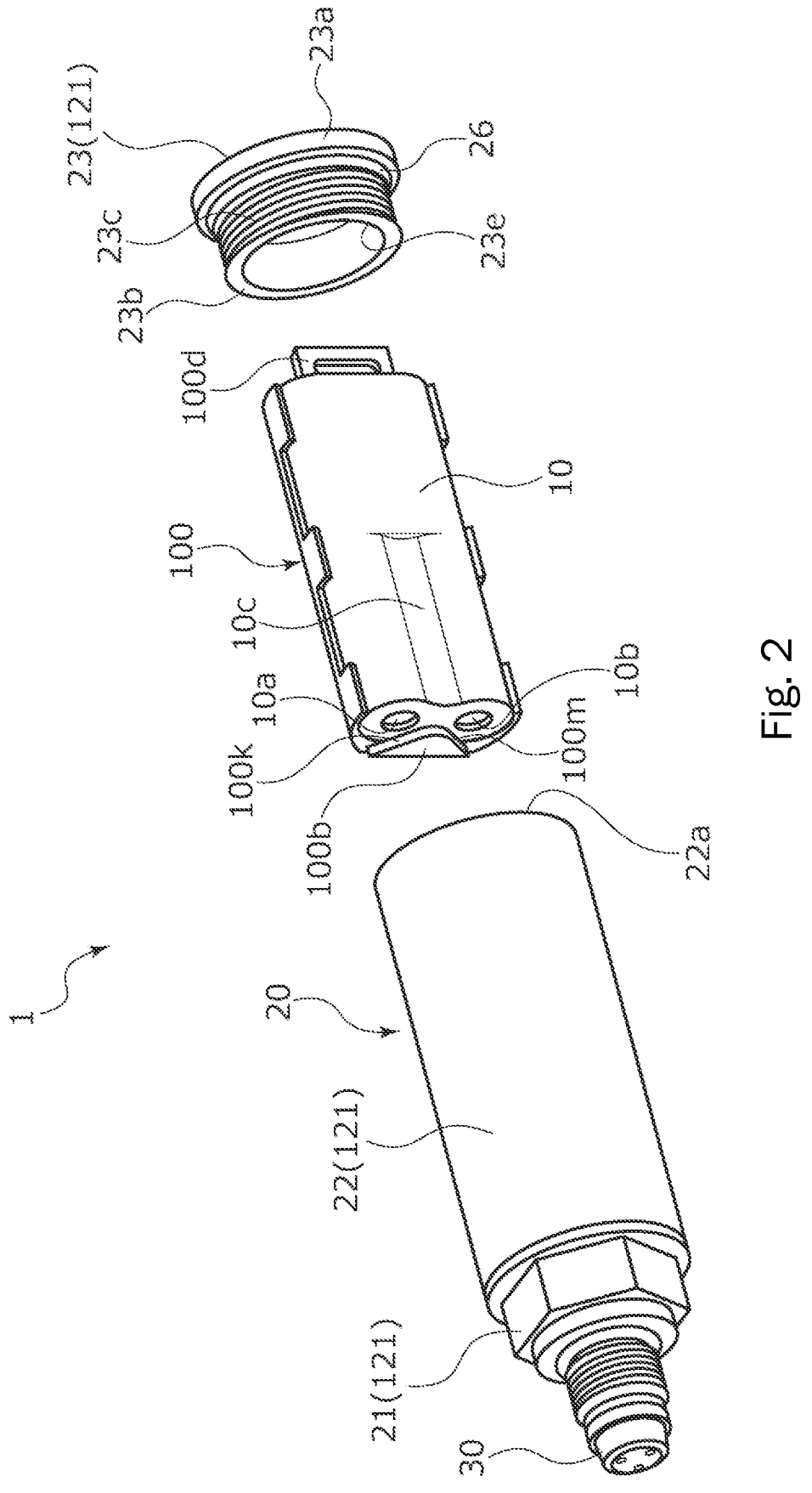
FIG. 2 is an exploded perspective view illustrating the structure of the pressure sensor in the first embodiment.
Figure 3:
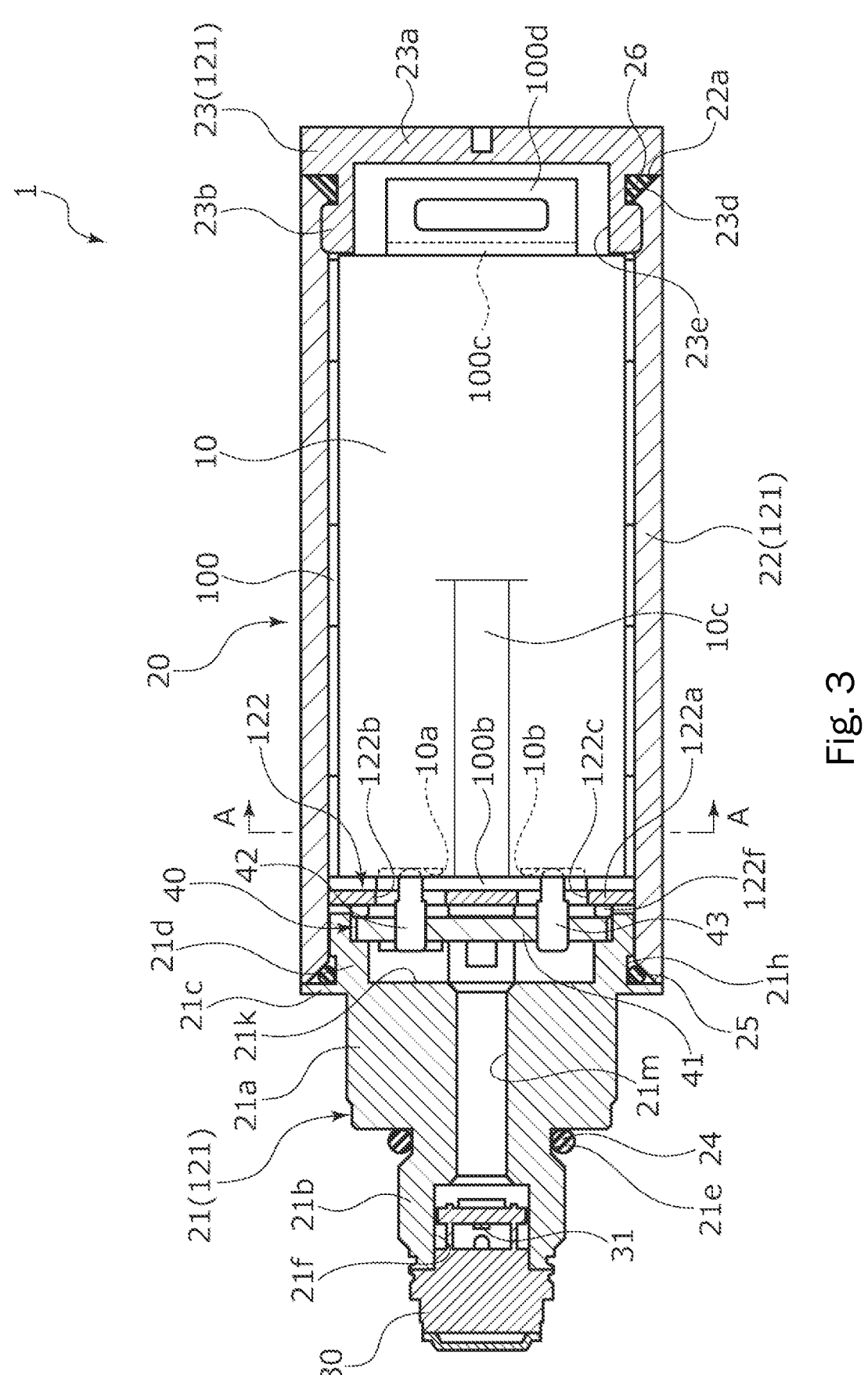
FIG. 3 is a cross-sectional view illustrating the structure of the pressure sensor in the first embodiment.

As illustrated in FIG. 1, the pressure sensor 1 mainly includes a housing 20, the sensor unit 30, a battery holder 100 (see FIG. 2), and a circuit unit 40 (see FIG. 3). The sensor unit 30 is attached to the left end portion of the housing 20. The battery holder 100 is placed in the housing 20 and holds the battery 10.

For example, a screw portion 20*a* of the housing 20 is screwed into a mounting port of a pipe (not illustrated) to fix and use the pressure sensor 1. The screw portion 20*a* is formed at the left end portion of the outer periphery of the housing 20. Accordingly, a sensor element (not illustrated) provided in the sensor unit 30 outputs a voltage corresponding to the pressure applied from the object to be measured, the fluid, inside the pipe. A processing chip 31 (see FIG. 3) converts this voltage into a pressure signal.

Figure 4:
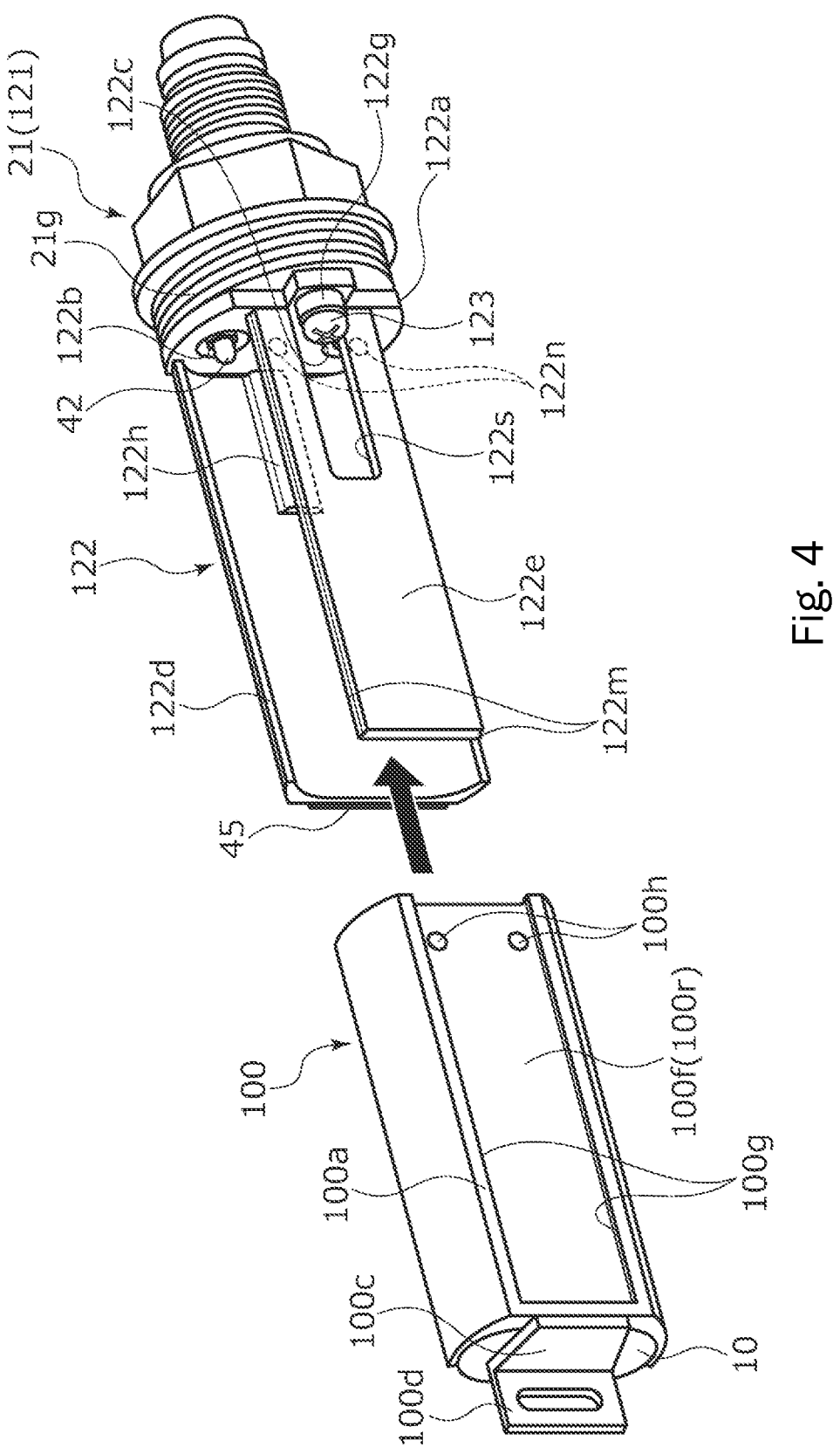
FIG. 4 is a perspective view illustrating the structure of an inner case and a battery holder in the first embodiment. For convenience of explanation.
Figure 5:
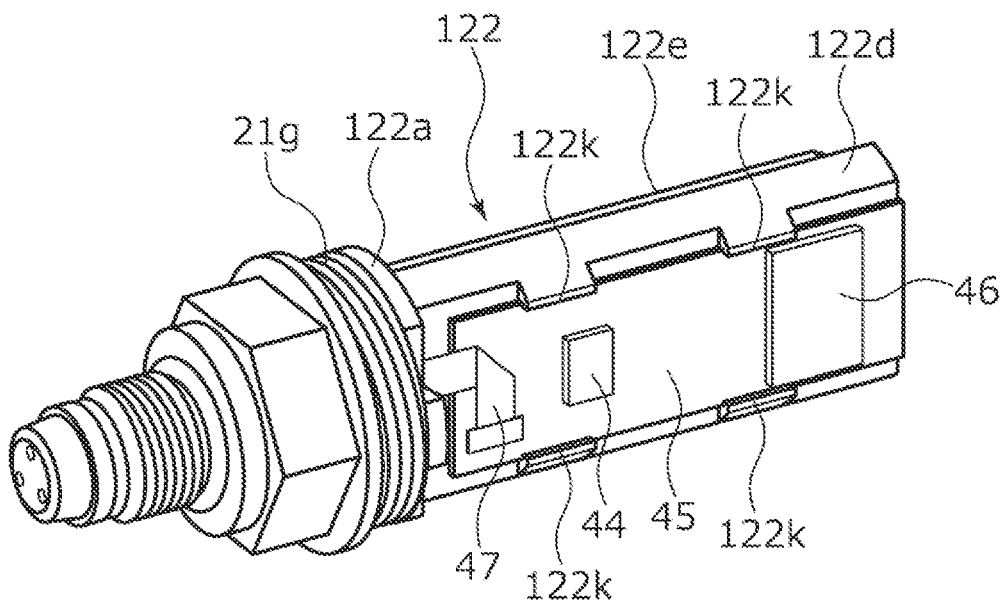
FIG. 5 is a perspective view illustrating the structure of the inner case in the first embodiment. For convenience of explanation.

As illustrated in FIGS. 2 and 3, the housing 20 includes a mounting member 21, an outer case 121, and an inner case 122 (see FIGS. 4 and 5). The screw portion 20*a* (see FIG. 1) is formed at the left end portion of the mounting member 21. The outer case 121 includes a cover member 22 attached to the right end portion of the mounting member 21 and the cap member 23 closing an opening 22*a* on the right side of the cover member 22. The inner case 122 is fixed to the mounting member 21 and is covered with the cover member 22 and the cap member 23, namely, the outer case 121.

As illustrated in FIG. 3, the mounting member 21 includes a tubular base portion 21*a*, a small diameter portion 21*b* extending to the left from the base portion 21*a*, a flange portion 21*c* projecting radially outward from the right end portion of the outer periphery of the base portion 21*a*, and a large diameter portion 21*d* extending to the right from the base portion 21*a*.

The small diameter portion 21*b* has the screw portion 20*a* (see FIG. 1) described above formed on the outer periphery. The small diameter portion 21*b* also has an annular recess 21e formed at the right end portion of the outer periphery, and an O-ring 24 is mounted on the recess 21e. The screw portion 20a formed on the outer periphery of the small diameter portion 21b is screwed into the mounting port of the pipe (not illustrated) to compress the O-ring 24 between the pipe and the mounting member 21 to ensure the sealing performance.

Further, a recess 21f is formed at the left end portion of the small diameter portion 21b, the recess 21f being recessed to the right, and the sensor unit 30 is inserted into the recess 21f from the left to be fixed by welding. Although details are omitted, the sealing performance is ensured so that the object to be measured, the fluid, would not enter the side of a through hole 21m on which the processing chip 31 is arranged.

The large diameter portion 21d has a screw portion 21g (see FIGS. 4 and 5) formed on the outer periphery. The large diameter portion 21d also has an annular recess 21h formed at the left end portion of the outer periphery, and an O-ring 25 is mounted on the recess 21h. A screw portion (not illustrated) formed on the inner periphery of the left end portion of the cover member 22 is screwed into the screw portion 21g formed on the outer periphery of the large diameter portion 21d to compress the O-ring 25 between the mounting member 21 and the cover member 22 to ensure the sealing performance.

Further, a stepped recess 21k is formed at the right end portion of the large diameter portion 21d, the stepped recess 21k being recessed to the left, and a part of the circuit unit 40 is housed in the recess 21k. The recess 21f formed in the small diameter portion 21b and the recess 21k formed in the large diameter portion 21d are communicated with each other through the through hole 21m extending through the base portion 21a in the left-right direction. Further, the sensor unit 30 and the circuit unit 40 are electrically connected to each other by a flexible printed wiring board (not illustrated) extending in the through hole 21m.

Here, the circuit unit 40 will be described. As illustrated in FIG. 3, the circuit unit 40 mainly includes a disk-shaped circuit board 41, a positive terminal 42 and a negative terminal 43, and a rectangular plate-shaped circuit board 45 (see FIG. 5) on which a processing chip 44 and a wireless chip 46 are mounted. The circuit board 41 is housed in the recess 21k of the large diameter portion 21d in the mounting member 21. The positive terminal 42 and the negative terminal 43 are arranged side by side to extend through the circuit board 41 in the thickness direction. The circuit board 45 is held on the outer surface of a first plate portion 122d of the inner case 122, which will be described later. The processing chip 44 adjusts the electric power supplied from the battery 10, processes the signal input from the sensor unit 30, and the like. The wireless chip 46 is provided on the circuit board 45 to establish communication with the outside. The circuit board 41 and the circuit board 45 are electrically connected to each other by a flexible flat cable 47. Further, the positive terminal 42 and the negative terminal 43 may not extend through the circuit board 41 in the thickness direction.

As illustrated in FIGS. 3 and 4, the positive terminal 42 and the negative terminal 43 are so-called probe pins, and each include urging means (not illustrated), and the electric contacts of the positive terminal 42 and the negative terminal 43 are elastically contractible in an axial direction and are urged in the extending direction. Specifically, the positive terminal 42 and the negative terminal 43 extend through two through holes 122b, 122c that are formed side by side to extend through a base portion 122a of the inner case 122 in the thickness direction, and are supported to be retractable to the left with respective electrical contacts projecting from the through holes 122b, 122c. As illustrated in FIG. 3, the positive terminal 42 and the negative terminal 43 are slightly retracted to the left with the battery holder 100 attached. That is, the positive terminal 42 and the negative terminal 43 are in elastic pressure contact with a positive electrode 10a and a negative electrode 10b of the battery 10 held by the battery holder 100, respectively.

Accordingly, the positive electrode 10a and the negative electrode 10b of the battery 10 held by the battery holder 100 are in contact with the positive terminal 42 and the negative terminal 43, so that the circuit unit 40 can supply power to the sensor unit 30. Further, when the circuit unit 40 receives an input of a pressure signal from the sensor unit 30, the processing chip 44 can process the signal, and the wireless chip 46 can establish communication with the outside.

As illustrated in FIGS. 2 and 3, the cover member 22 constituting the outer case 121 forms a cylindrical shape, and the left end portion thereof is screwed into the screw portion 21g (see FIGS. 4 and 5) formed on the outer periphery of the large diameter portion 21d of the mounting member 21 to attach the cover member 22. Further, a screw portion 23c of the cap member 23 is screwed into the right end portion of the cover member 22 to close the opening 22a, the cap member 23 also constituting the outer case 121.

The cap member 23 includes a disk-shaped base portion 23a and a small diameter portion 23b projecting to the left from the left side surface of the base portion 23a. The small diameter portion 23b has the screw portion 23c (see FIG. 2) formed on the outer periphery. The small diameter portion 23b also has an annular recess 23d formed at the right end portion of the outer periphery, and an O-ring 26 is mounted on the recess 23d. The screw portion 23c of the cap member 23 is screwed into a screw portion (not illustrated) formed on the inner periphery of the right end portion of the cover member 22 to compress the O-ring 26 between the cover member 22 and the cap member 23 to ensure the sealing performance. Accordingly, the internal space of the outer case 121 is defined to be substantially sealed, in which the circuit unit 40 and the battery holder 100 are housed.

Further, a recess 23e is formed at the left end portion of the small diameter portion 23b, the recess 23e being recessed to the right, and a handle 100d is housed in the recess 23e, the handle 100d being formed at the right end portion of the battery holder 100.

As illustrated in FIGS. 3 to 6, the inner case 122 is made of a resin material and includes the base portion 122a, and the first plate portion 122d and a second plate portion 122e that extend from the base portion 122a in a direction in which the cap member 23 is arranged, namely, to the right (to the left in FIG. 4). The base portion 122a of the inner case 122 is fixed to the mounting member 21 by a screw 123 (see FIG. 4).

The base portion 122a has through holes 122b, 122c formed side by side as described above. Further, as illustrated in FIG. 3, a plurality of protrusions 122f is formed on the radially outer side of the left surface of the base portion 122a, the protrusions 122f projecting to the left. The radially outer portion of the circuit board 41 constituting the circuit unit 40 is held in the left-right direction between the tips of these protrusions 122f and the stepped portion formed in the recess 21k of the mounting member 21 when the inner case 122 is fixed to the mounting member 21. Accordingly, the circuit board 41 can be securely supported between the inner case 122 and the mounting member 21 (see FIG. 3).

Further, a boss 122g is provided on the right surface (the left surface in FIG. 4) of the base portion 122a, the boss 122g having a through hole through which the screw 123 extends.

Figure 6:
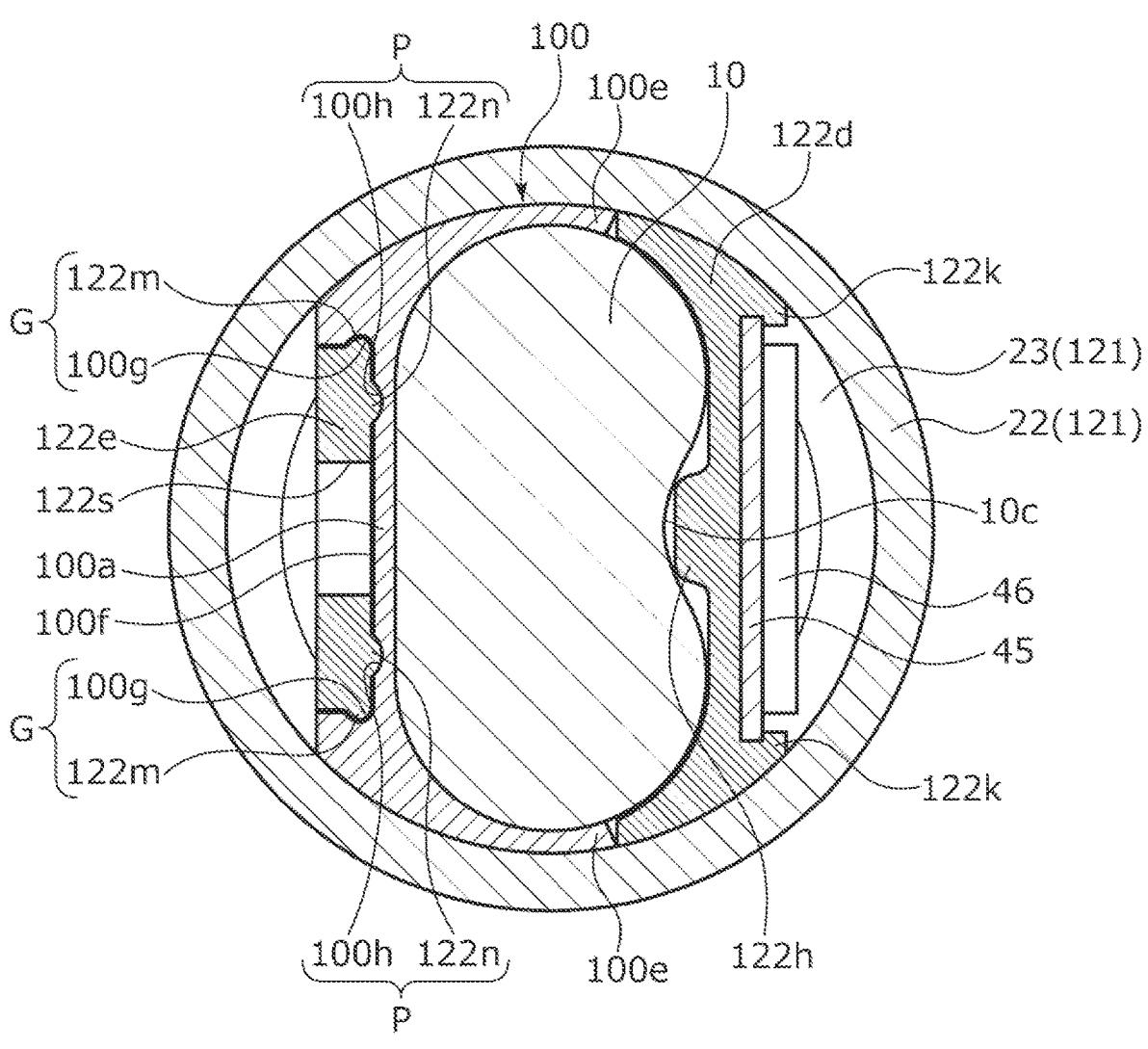
FIG. 6 is a cross-sectional view taken along the line A-A of FIG. 3.

As illustrated in FIGS. 4 and 6, the inner surface of the first plate portion 122d is curved along the surface shape of the battery 10 held by the battery holder 100. Further, a rectangular protrusion 122h is formed in the left end portion (the right end portion in FIG. 4) of the inner surface of the first plate portion 122d, and can be fitted into a recess 10c (see FIGS. 2 and 3) formed on the surface of the battery 10. Accordingly, a direction in which the battery holder 100 is inserted into and removed from the inner case 122 can be restricted to prevent the reverse connection of the battery 10.

Further, as illustrated in FIGS. 5 and 6, the outer surface of the first plate portion 122d forms a flat surface at the substantially vertically central portions, and a pair of upper and lower hook-shaped projections 122k is provided at the upper and lower end portions of the first plate portion 122d at each of two locations in the left-right direction, and can hold the circuit board 45 constituting the circuit unit 40. The circuit board 45 is inserted between the upper and lower projections 122k from the right side of the first plate portion 122d. Further, the upper and lower side surfaces of the first plate portion 122d are curved along the inner periphery of the cover member 22 constituting the outer case 121.

As illustrated in FIGS. 4 and 6, the second plate portion 122e is formed to have a smaller dimension in the vertical direction, namely, in the lateral direction than the first plate portion 122d. Further, a pair of protruded portions 122m is formed on the inner surface side of the upper and lower end portions of the second plate portion 122e to extend in the left-right direction, namely, the longitudinal direction, which is the direction of insertion and removal of the battery holder 100. The protruded portions 122m each form a semicircular shape in cross section.

Further, a pair of upper and lower hemispherical protrusions 122n is formed at the left end portion (the right end portion in FIG. 4) on the inner surface of the second plate portion 122e.

Further, a substantially rectangular cutout 122s is formed at a substantially vertically central portion of the right end portion (the right end portion in FIG. 4) of the second plate portion 122e. The cutout 122s is formed in the second plate portion 122e to prevent a tool such as a driver from interfering with the second plate portion 122e. This facilitates the tightening of the screw 123 into the through hole of the boss 122g formed in the base portion 122a.

Next, the battery holder 100 will be described. In the first embodiment, an aspect of holding the pack lithium battery 10 (hereinafter, simply referred to as "battery 10") that includes the positive electrode 10a and the negative electrode 10b arranged side by side on one end side of the battery holder 100 in the longitudinal direction will be described. Further, in the first embodiment, the positive terminal and the negative terminal on the side of the battery holder 100 are the positive electrode 10a and the negative electrode 10b of the battery 10.

Figure 7:
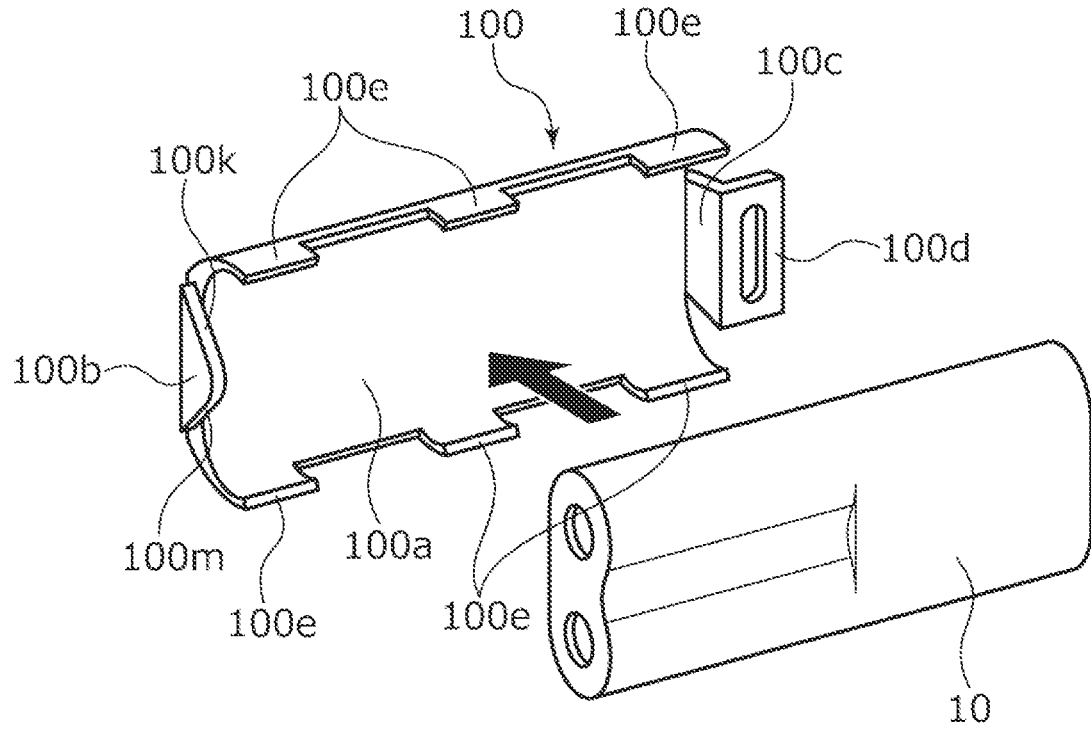
FIG. 7 is an exploded perspective view illustrating the structure of the battery holder in the first embodiment.

As illustrated in FIGS. 6 and 7, the battery holder 100 mainly includes a base portion 100a, wall portions 100b, 100c, and a handle 100d. The base portion 100a has an inner surface curved along the surface shape of the battery 10. The wall portion 100b is formed into a substantially triangular shape standing from the left end portion of the base portion 100a toward the inner surface side. The wall portion 100c is formed into a rectangular shape standing from the right end portion of the base portion 100a toward the inner surface side. The handle 100d bends from the wall portion 100c and extends to the right.

As illustrated in FIG. 2, the wall portion 100b forms a substantially triangular shape, and is in contact with one end of the battery 10 in the longitudinal direction with the battery 10 held by the battery holder 100. Accordingly, the positive electrode 10a and the negative electrode 10b of the battery 10 are exposed from cutout spaces 100k, 100m (see FIG. 7) of the battery holder 100. Further, the wall portion 100b may be formed into any shape as long as the positive terminal 42 and the negative terminal 43 can extend through the wall portion 100b and the wall portion 100b can expose the positive electrode 10a and the negative electrode 10b of the battery 10 so that they can be in contact with the positive terminal 42 and the negative terminal 43, respectively, and instead of the cutout shape, a through hole may be formed in the wall portion.

A pair of upper and lower paired claws 100e is provided at each of three locations in the left-right direction at the upper and lower end portions of the base portion 100a and can hold the battery 10.

Further, as illustrated in FIG. 6, the base portion 100a has an outer surface forming a flat surface at substantially vertically central portion, and has an insertion recess 100f. The insertion recess 100f is open to the left side (the right side in FIG. 4) on which the wall portion 100b is formed, so that the second plate portion 122e of the inner case 122 can be inserted from the right side (the left side in FIG. 4) into the insertion recess 100f. A pair of recessed grooves 100g is formed on the inner surface side of the upper and lower inner walls of the insertion recess 100f, the grooves 100g extending in the left-right direction, namely, the longitudinal direction, that is the direction of insertion and removal of the battery holder 100, and facing each other in the vertical direction, namely, the lateral direction. The recessed grooves 100g each forms a semicircular shape in cross section, and constitute a pair of guide portions G that guides the movement of the battery holder 100 in a direction of insertion and removal together with the pair of protruded portions 122m formed on the inner case 122 described above.

Further, the bottom surface 100r of the insertion recess 100f has a pair of upper and lower hemispherical recesses 100h formed at the left end portion (the right end portion in FIG. 4). The pair of protrusions 122n formed on the inner case 122 described above can be recess-protrusion fitted into the recesses 100h to constitute positioning mechanisms P for the battery holder 100 and to lock the battery holder 100 so that it would not move in the left-right direction accidentally. Further, the wall portion 100b of the battery holder 100 is in contact with the right surface of the base portion 122a of the inner case 122 with the protrusions 122n of the inner case 122 recess-protrusion fitted into the recesses 100h (see FIG. 3).

Accordingly, the guide portions G is constituted by recessed grooves and protrusions extending in the direction of insertion and removal of the battery holder 100, that is, the recessed grooves 100g of the battery holder 100 and the protruded portions 122m of the inner case 122 and can prevent the inclination of the battery holder 100 that is inserted into and removed from the inner case 122 constituting the housing 20. Therefore, the positive electrode 10a and the negative electrode 10b of the battery 10 held by the battery holder 100 can be accurately connected to the positive terminal 42 and the negative terminal 43 of the pressure sensor 1.

Further, the protruded portions 122*m* of the inner case 122 are formed to extend in the longitudinal direction of the second plate portion 122*e*. Accordingly, the guide portions G are continuously formed in the direction of insertion and removal of the battery holder 100, so that the inclination of the battery holder 100 can be reliably prevented.

Further, the recessed grooves 100*g* constituting the guide portions G are provided at positions facing each other, specifically, at positions facing each other in the lateral direction of the battery holder 100. Accordingly, since the guide portions G are provided at two locations facing each other, the inclination of the battery holder 100 that is inserted into the inner case 122 can be further prevented.

Further, the housing 20 includes an outer case 121 composed of the mounting member 21, the cover member 22, and the cap member 23, and the inner case 122 arranged inside the outer case 121, and the circuit board 45 constituting the circuit unit 40 is fixed to the outer surface of the first plate portion 122*d* of the inner case 122. Accordingly, the circuit board 45 is protected by the inner case 122, so that it cannot be directly affected by the impact from the outside of the outer case 121 or the insertion and removal of the battery holder 100.

Further, the inner case 122 is provided with through holes 122*b*, 122*c* which extend therethrough in the direction of insertion and removal of the battery holder 100, that is, in the left-right direction, and from which the positive terminal 42 and the negative terminal 43 of the pressure sensor 1 project. Accordingly, when the wall portion 100*b* of the battery holder 100 is brought into contact with the base portion 122*a* of the inner case 122 from the right, the positive electrode 10*a* and the negative electrode 10*b* of the battery 10 held by the battery holder 100 can be prevented from being pressed against the positive terminal 42 and the negative terminal 43 of the pressure sensor 1 by an excessive force.

Further, positioning mechanisms P are provided between the inner case 122 and the battery holder 100 to define the progress of insertion of the battery holder 100 by recess-protrusion fitting of the recesses 100*h* and the protrusions 122*n*. Accordingly, the positive electrode 10*a* and the negative electrode 10*b* of the battery 10 held by the battery holder 100 can be in contact with the positive terminal 42 and the negative terminal 43 of the pressure sensor 1 with an appropriate force.

Further, the battery holder 100 can be inserted and removed with the pressure sensor 1 installed in the installed portion such as a pipe to facilitate the battery replacement. Specifically, without removing the entire housing 20 from the installed portion such as pipe, only the cap member 23 is detached, and only the battery holder 100 holding the battery 10 is inserted and removed, so that the battery replacement can be easily made. Accordingly, the sensor unit 30 and the circuit unit 40 do not need to be touched and moved at the time of battery replacement, so that the pressure sensor 1 can stably sense the object to be measured.

Further, since the battery holder 100 is provided with the handle 100*d*, the handle 100*d* is used to remove the battery holder 100, facilitating drawing the battery holder 100 from the pressure sensor 1.

The outer case 121 constituting the housing 20 may be configured to have a reverse screw so that the cover member 22 and the mounting member 21 would not rotate together when the cap member 23 is removed, or may be configured such that the fastening force between the cap member 23 and the cover member 22 is the weakest.

Second Embodiment

An electronic device according to a second embodiment of the present invention will be described with reference to FIG. 8. The redundant descriptions of the same configuration as in the first embodiment will be omitted.

Figure 8:
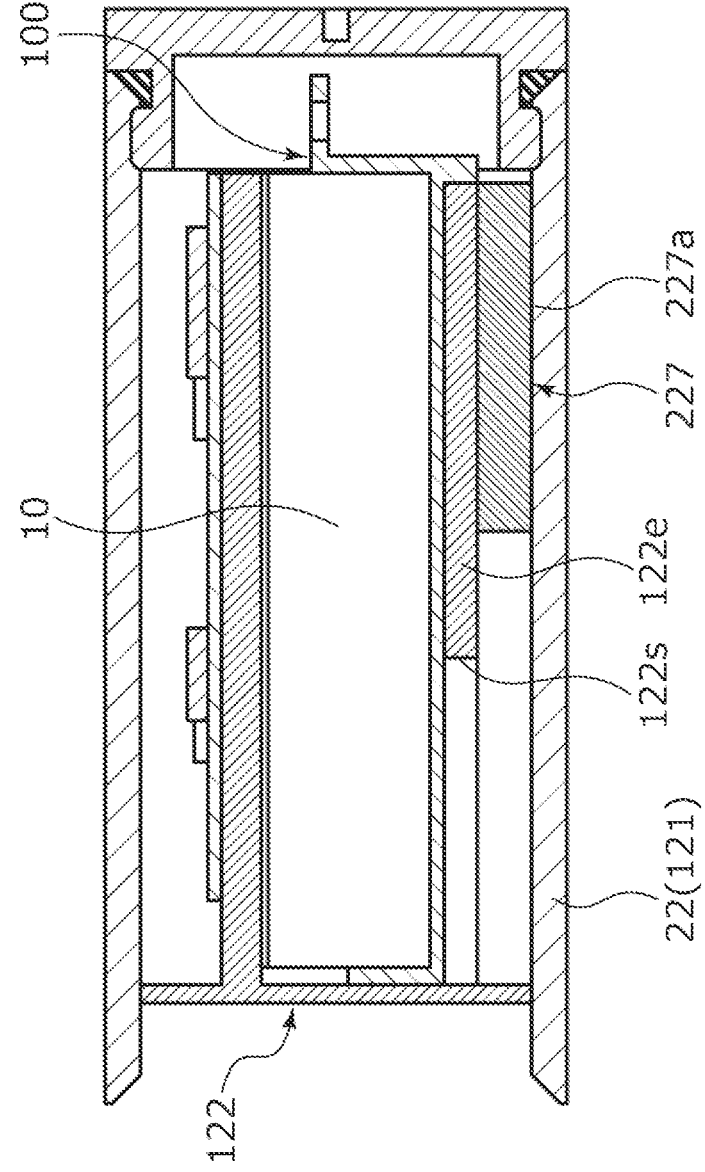
FIG. 8 is a cross-sectional view illustrating the structure of a battery holder of an electronic device according to a second embodiment of the present invention. For convenience of explanation.

As illustrated in FIG. 8, in the second embodiment, a gap adjusting member 227 having a substantially rectangular cross section is fixed to the outer surface of the second plate portion 122*e* constituting the inner case 122. The gap adjusting member 227 is made of a resin material. Further, a surface portion 227*a* of the gap adjusting member 227 can be in pressure contact with the cover member 22 constituting the housing 20, specifically, the inner periphery of the outer case 121. In other words, the gap adjusting member 227 fills the gap between the inner periphery of the outer case 121 and the inner case 122. Further, the gap adjusting member 227 is arranged on the right side of the cutout 122*s*.

The surface portion 227*a* of the gap adjusting member 227 may be curved along the inner periphery of the cover member 22. Further, the surface portion 227*a* of the gap adjusting member 227 may not be in pressure contact with the inner periphery of the cover member 22 as long as it is in contact therewith. Further, the gap adjusting member 227 may be integrally molded with the inner case 122.

Accordingly, with the battery holder 100 attached to the inner case 122, the gap adjusting member 227 is arranged in the gap formed between the outer surface of the second plate portion 122*e* constituting the inner case 122 and the inner periphery of the cover member 22, and the surface portion 227*a* is in pressure contact with the inner periphery of the cover member 22. Thus, the rattling of the battery holder 100 attached to the inner case 122 can be prevented. Accordingly, the contact between the positive terminal 42 and the negative terminal 43 of the pressure sensor 1 and the positive electrode 10*a* and the negative electrode 10*b* of the battery 10 held by the battery holder 100 can be stabilized.

Further, the battery holder 100 receives a force from the positive electrode 10*a* and the negative electrode 10*b* of the battery 10 at the front in the direction of insertion and receives a force from the gap adjusting member 227 at the rear side portion in the direction of insertion, so that the battery holder 100 is less likely to rattle with the battery holder 100 attached to the housing 20. Additionally, since the gap adjusting member 227 is provided at the rear in the direction of insertion, the battery holder 100 and the inner case 122 are easily inserted into the outer case 121.

Third Embodiment

An electronic device according to a third embodiment of the present invention will be described with reference to FIG. 9. The redundant descriptions of the same configuration as in the first embodiment will be omitted.

Figure 9:
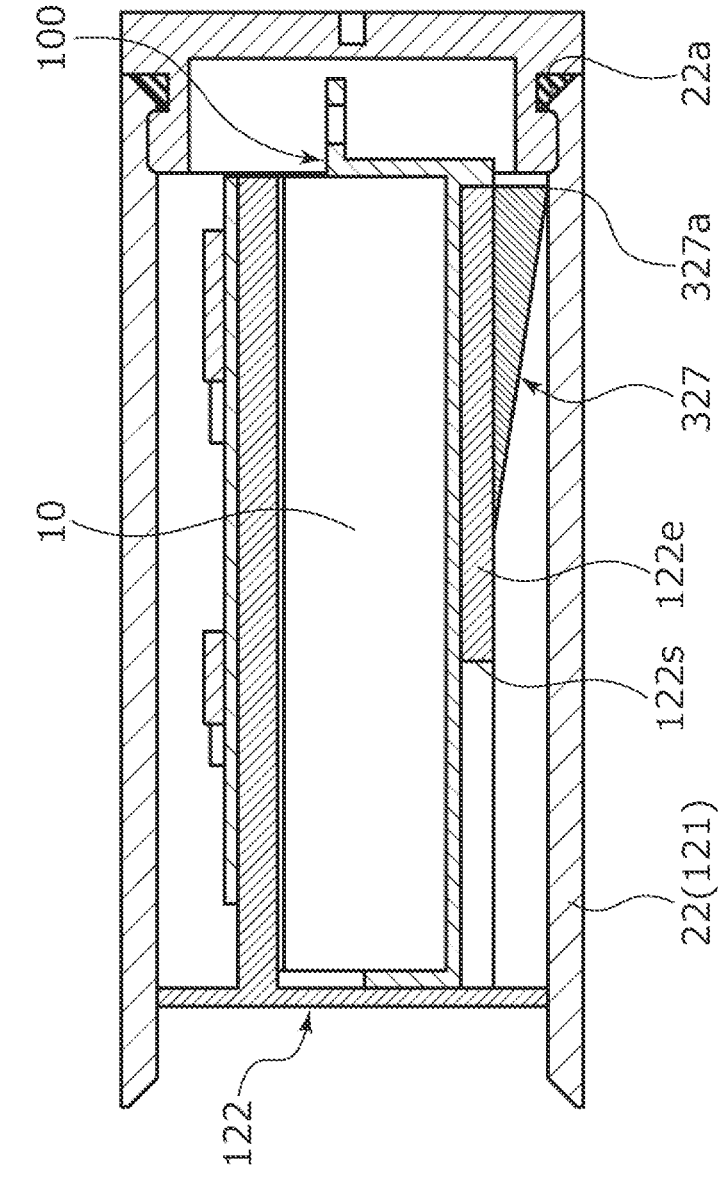
FIG. 9 is a cross-sectional view illustrating the structure of a battery holder of an electronic device according to a third embodiment of the present invention. For convenience of explanation.

As illustrated in FIG. 9, in the third embodiment, a gap adjusting member 327 having a right-angled triangular cross section is fixed to the outer surface of the second plate portion 122*e* constituting the inner case 122. The gap adjusting member 327 is made of a resin material. Further, the gap adjusting member 327 includes a corner portion 327*a* that can be in pressure contact with the inner periphery of the cover member 22 constituting the housing 20. In other words, the gap adjusting member 327 is in contact with the inner periphery of the outer case 121 due to its deflection. Further, the gap adjusting member 327 is arranged on the right side of the cutout 122*s*.

Additionally, the corner portion 327*a* is formed at the right end portion of the gap adjusting member 327. The corner portion 327*a* of the gap adjusting member 327 may be curved along the inner periphery of the cover member 22. Further, the corner portion 327*a* of the gap adjusting member 327 may not be in pressure contact with the inner periphery of the cover member 22 as long as it is in contact therewith. Further, the gap adjusting member 327 may be integrally molded with the inner case 122.

Accordingly, with the battery holder 100 attached to the inner case 122, the gap adjusting member 327 is arranged in the gap formed between the outer surface of the second plate portion 122e constituting the inner case 122 and the inner periphery of the cover member 22, and the corner portion 327a is in pressure contact with the inner periphery of the cover member 22. Thus, the rattling of the battery holder 100 attached to the inner case 122 can be prevented. Accordingly, the contact between the positive terminal 42 and the negative terminal 43 of the pressure sensor 1 and the positive electrode 10a and the negative electrode 10b of the battery 10 held by the battery holder 100 can be stabilized.

Further, the battery holder 100 receives a force from the positive electrode 10a and the negative electrode 10b of the battery 10 at the front in the direction of insertion and receives a force from the gap adjusting member 227 at the rear side portion in the direction of insertion, so that the battery holder 100 is less likely to rattle with the battery holder 100 attached to the housing 20.

Further, only the corner portion 327a of the gap adjusting member 327 is in pressure contact with the inner periphery of the cover member 22, so that the resistance due to sliding between the corner portion 327a of the gap adjusting member 327 and the inner periphery of the cover member 22 can be reduced, and the battery holder 100 can be smoothly inserted into and removed from the inner case 122.

Further, since the corner portion 327a is formed at the right end portion of the gap adjusting member 327, the sliding between the corner portion 327a of the gap adjusting member 327 and the inner periphery of the cover member 22 is performed in a narrow range at or near an opening 22a on the right side of the cover member 22. Accordingly, the gap adjusting member 327 is less likely to interfere with the insertion and removal of the battery holder 100 into and from the inner case 122.

Fourth Embodiment

An electronic device according to a fourth embodiment of the present invention will be described with reference to FIG. 10. The redundant descriptions of the same configuration as in the first embodiment will be omitted.

Figure 10:
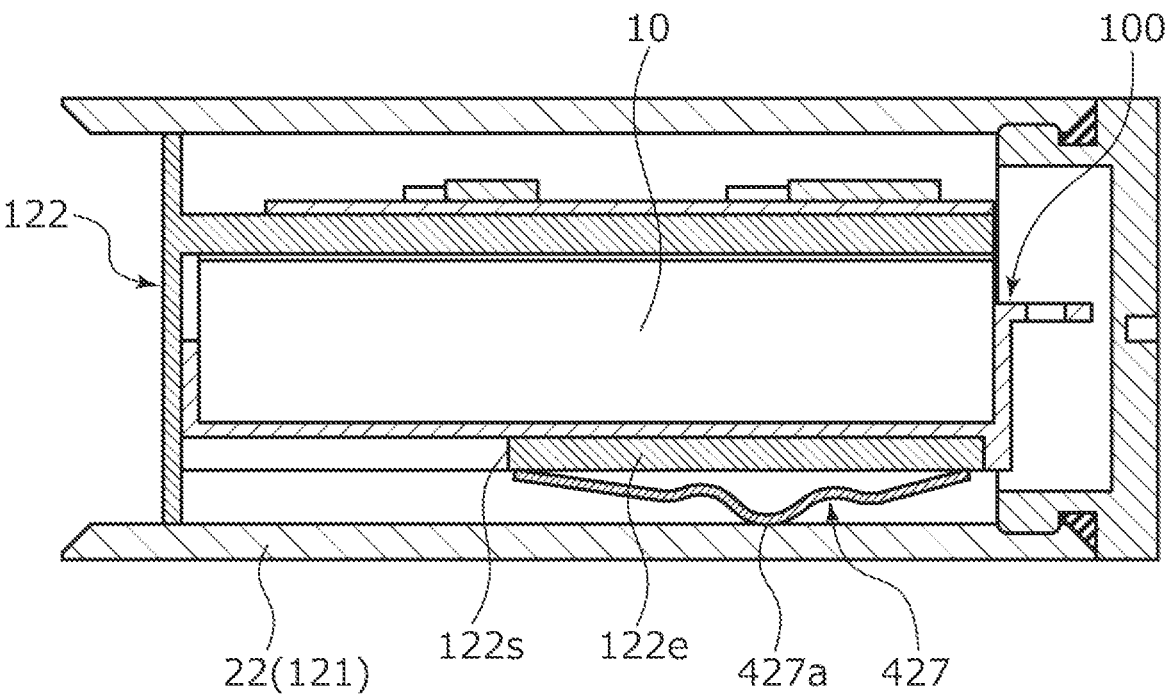
FIG. 10 is a cross-sectional view illustrating the structure of a battery holder of an electronic device according to a fourth embodiment of the present invention. For convenience of explanation.

As illustrated in FIG. 10, in the fourth embodiment, a gap adjusting member 427 configured as a thin leaf spring is fixed to the outer surface of the second plate portion 122e constituting the inner case 122. The gap adjusting member 427 includes a bent portion 427a that can be in pressure contact with the inner periphery of the cover member 22 constituting the housing 20. Further, the gap adjusting member 427 is arranged on the right side of the cutout 122s. The bent portion 427a of the gap adjusting member 427 may not be in pressure contact with the inner periphery of the cover member 22 as long as it is in contact therewith.

Accordingly, with the battery holder 100 attached to the inner case 122, the gap adjusting member 427 is arranged in the gap formed between the outer surface of the second plate portion 122e constituting the inner case 122 and the inner periphery of the cover member 22, and the bent portion 427a of the gap adjusting member 427 is in pressure contact with the inner periphery of the cover member 22. Thus, the rattling of the battery holder 100 attached to the inner case 122 can be prevented. Accordingly, the contact between the positive terminal 42 and the negative terminal 43 of the pressure sensor 1 and the positive electrode 10a and the negative electrode 10b of the battery 10 held by the battery holder 100 can be stabilized.

Further, the battery holder 100 receives a force from the positive electrode 10a and the negative electrode 10b of the battery 10 at the front in the direction of insertion and receives a force from the gap adjusting member 427 at the rear side portion in the direction of insertion, so that the battery holder 100 is less likely to rattle with the battery holder 100 attached to the housing 20.

Further, only the bent portion 427a of the gap adjusting member 427 is in pressure contact with the inner periphery of the cover member 22, so that the resistance due to sliding between the bent portion 427a of the gap adjusting member 427 and the inner periphery of the cover member 22 can be reduced, and the battery holder 100 can be smoothly inserted into and removed from the inner case 122.

The gap adjusting member 427 may be fixed to the inner surface of the inner case 122. In this case, preferably, opposite ends of the thin leaf spring are fixed to the inner surface of the inner case 122, and the bent portion 427a projects toward the inner surface side of the inner case 122.

Although the embodiments of the present invention have been described above with reference to the drawings, the specific configuration is not limited to these embodiments, and any changes or additions made without departing from the scope of the present invention are included in the present invention.

For example, the electronic device according to the present invention is not limited to the pressure sensor, and may be applied to other sensors or electronic devices other than the sensor as long as it includes a battery as the power source.

Further, the electronic device may be configured such that a battery other than the pack lithium battery described above, for example, a button cell, an AA battery, a AAA battery, a square battery, and a coin battery can be held by the battery holder.

Further, in the first to fourth embodiments, the configuration in which the positive electrode and the negative electrode of the battery held by the battery holder as the positive terminal and the negative terminal on the battery holder side are in direct contact with the positive terminal and the negative terminal of the pressure sensor has been described. However, the present invention may be limited to this, the wall portion standing at one end of the battery holder in the longitudinal direction may be provided with electrode terminals that are electrically connected to the battery and can be in contact with the positive terminal and the negative terminal of the pressure sensor. Further, as long as the positive terminal and the negative terminal on the battery holder side are arranged side by side in the vertical direction, the left and right positions thereof may not be the same.

Figures 11, 11B, 11C, 11D, 11E, 11F:
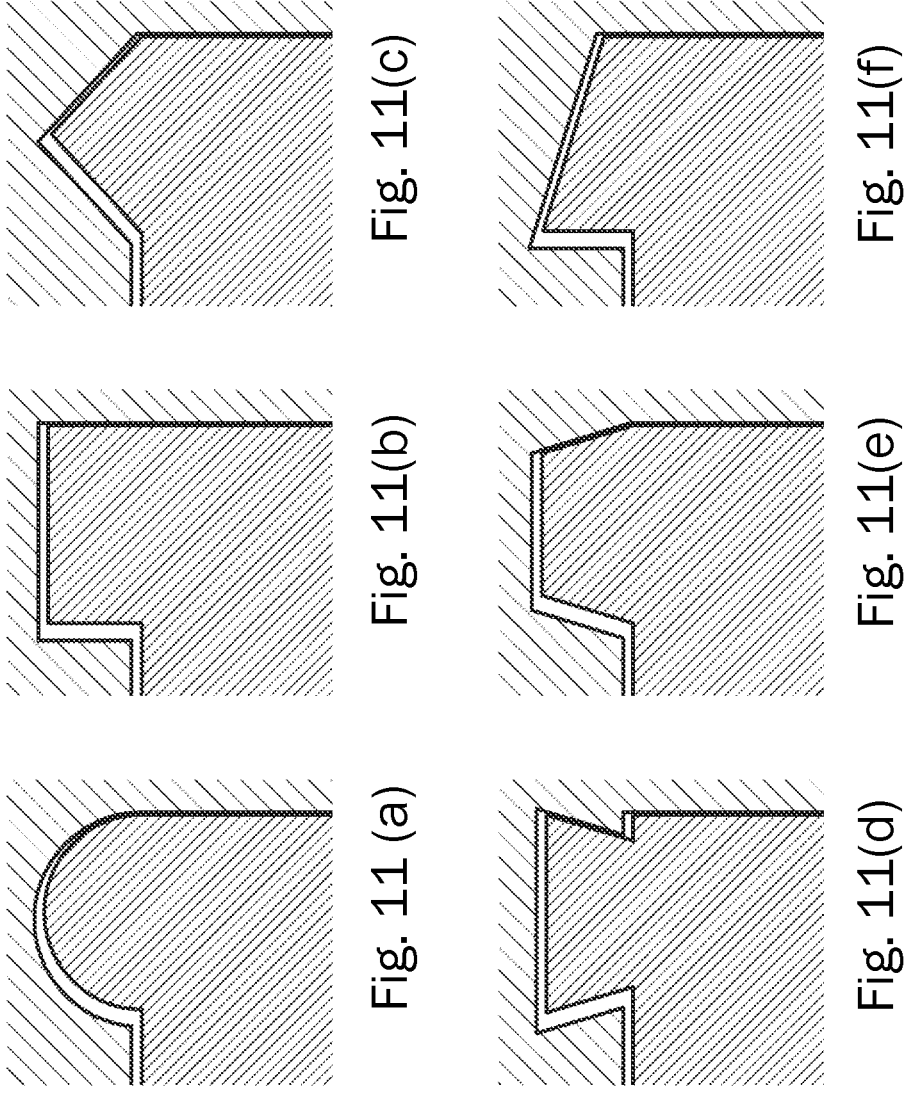
FIGS. 11(*a*)-11(*f*) are cross-sectional image diagrams illustrating a guide portion and its modified examples in the first to fourth embodiments and guide portions.

Further, the protruded portions and the recessed grooves constituting the guide portions are not limited to those formed into a semicircular shape described above as illustrated in the cross-sectional image diagram of FIG. 11A, and may have any shape as long as the protruded portions can be inserted into and removed from the recessed grooves from one end in the longitudinal direction and can guide the sliding of the battery holder. Specifically, the protruded portions and the recessed grooves may be formed into other shapes, for example, a rectangle as a quadrangle (see FIG. 11B), a widened trapezoid (see FIG. 11D), a tapered trapezoid (see FIG. 11E), other quadrangles (see FIG. 11F), and a triangle (see FIG. 11C).

Further, the protruded portions and the recessed grooves constituting the guide portions are not limited to those formed into substantially the same shape. For example, the recessed grooves may be formed into a rectangular shape, and the protruded portions may be formed into a shape different from the recessed grooves, for example, a shape as illustrated in FIG. 11.

Further, the pair of protruded portion and recessed portion constituting the guide portion is not limited to that formed into the same shape, and may have different shapes.

Further, the protruded portions and the recessed grooves constituting the guide portions may be formed to have a reverse recess-protrusion relationship. That is, the recessed grooves may be formed in the inner case, and the protruded portions may be formed in the battery holder.

Further, the guide portions are not limited to those provided at two locations facing each other in the lateral direction, and one guide portion may be provided or the guide portions may be provided at three or more locations.

Further, the guide portions are not limited to the protruded portions that are continuous in the direction of insertion and removal, and may be composed of a plurality of protruded portions arranged side by side in the direction of insertion and removal.

Figures 12A, 12B, 12C:
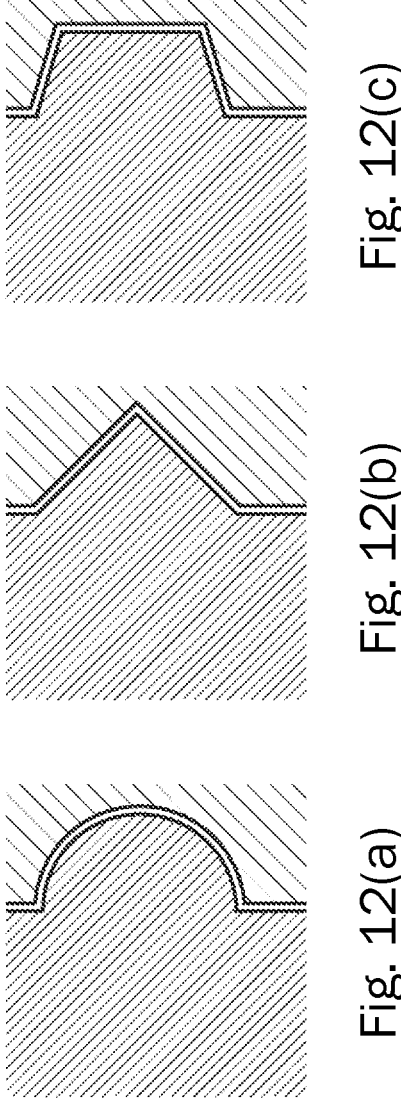
FIGS. 12(*a*)-12(*c*) are cross-sectional image diagrams illustrating a positioning mechanism and its modified examples in the first to fourth embodiments and positioning mechanisms.

Further, the protrusions and the recesses constituting the positioning mechanisms are not limited to those formed in the hemispherical shape described above as illustrated in the cross-sectional image diagram of FIG. 12A, and may have any shape as long as they allow the recess-protrusion fitting. Specifically, the shapes of the protrusions and the recesses may be formed into other shapes such as a triangle (see FIG. 12B) and a tapered trapezoid (see FIG. 12C). The shape of the protrusions constituting the positioning mechanisms preferably has a curved surface or an inclined surface that facilitates fitting into the recesses at the time of insertion of the battery holder.

Further, the protrusions and the recesses constituting the positioning mechanisms are not limited to those formed into substantially the same shape. For example, the recesses are formed into a rectangular shape, and the protrusions may be formed into a shape different from the recesses, for example, a shape as illustrated in FIG. 12.

Further, the pair of protrusion and recess constituting the positioning mechanism is not limited to that formed into the same shape, and may have different shapes.

Further, the protrusions and the recesses constituting the positioning mechanisms may be formed to have a reverse recess-protrusion relationship. That is, the recesses may be formed in the inner case, and the protrusions may be formed in the battery holder.

Further, the positioning mechanisms are not limited to those provided at two locations, and one positioning mechanism may be provided or the positioning mechanisms may be provided at three or more locations.

Further, a control chip and a wireless chip constituting the circuit unit may be provided at any position on the circuit board.

Further, in the second to fourth embodiments, the configuration in which the gap adjusting member is provided in the inner case constituting the valve housing has been described, but the present invention is not limited to this, and the gap adjusting member may be provided on the inner periphery of the cover member (the outer case) constituting the valve housing, or may be provided on both the inner case and the cover member.

REFERENCE SIGNS LIST

1 pressure sensor (electronic device)
10 pack lithium battery (battery)

10*a* positive electrode (positive terminal on battery holder side)
10*b* negative electrode (negative terminal on battery holder side)
20 housing
21 mounting member
22 cover member
23 cap member
30 sensor unit
40 circuit unit
41 circuit board
42 positive terminal (positive terminal of electronic device)
43 negative terminal (negative terminal of electronic device)
44 processing chip
45 circuit board
46 wireless chip
100 battery holder
100*b*, 100*c* wall portion
100*d* handle
100*e* claw
100*g* recessed groove (recessed groove of guide portion)
100*h* recess
100*k*, 100*m* cutout space
121 outer case
122 inner case
122*b*, 122*c* through hole
122*d* first plate portion
122*e* second plate portion
122*m* protruded portion (protrusion of guide portion)
122*n* protrusion
227 gap adjusting member
327 gap adjusting member
427 gap adjusting member
G guide portion
P positioning mechanism

The invention claimed is:

1. An electronic device comprising a housing and a battery holder configured for holding a battery and removably inserted into the housing, the electronic device further comprising a positive terminal and a negative terminal on a side of the battery holder and comprising another positive terminal and another negative terminal on a side of the housing, wherein the positive terminal and the negative terminal on the side of the battery holder are arranged side by side, the positive terminal and the negative terminal on the side of the housing are arranged side by side, the housing includes an outer case and an inner case arranged inside the outer case and provided with a guide portion, a circuit board of the electronic device is fixed to an outer surface of the inner case, the inner case is made of a resin material and includes a base portion, a first plate portion and a second plate portion that extend from the base portion in an insertion direction of the battery holder into the housing, a pair of protrusion portions is formed on an inner surface side at both ends of the second plate portion opposed to each other in the insertion direction so as to extend in the insertion direction, a pair of recessed grooves is formed in the battery holder so as to extend in the insertion direction, and the pair of protrusions and the pair of recessed grooves constitute a guide portion.

2. The electronic device according to claim 1, wherein the inner case is provided with through holes passing through the inner case in the insertion direction of the battery holder, and the positive terminal and the negative terminal on the side of the housing are protruded through the through holes.

3. The electronic device according to claim 1, wherein a positioning mechanism is provided between the inner case and the battery holder, and the positioning mechanism is configured to define progress of insertion of the battery holder.

4. The electronic device according to claim 3, wherein the positioning mechanism is performed by recess-protrusion fitting of a recess and a protrusion between the inner case and the battery holder.

5. The electronic device according to claim 1, wherein the battery holder is provided with a handle.

6. The electronic device according to claim 2, wherein a positioning mechanism is provided between the inner case and the battery holder, and the positioning mechanism is configured to define progress of insertion of the battery holder.

7. The electronic device according to claim 6, wherein the positioning mechanism is performed by recess-protrusion fitting of a recess and a protrusion between the inner case and the battery holder.

8. The electronic device according to claim 2, wherein the battery holder is provided with a handle.

9. The electronic device according to claim 3, wherein the battery holder is provided with a handle.

10. The electronic device according to claim 4, wherein the battery holder is provided with a handle.

11. An electronic device comprising a housing and a battery holder configured for holding a battery and removably inserted into the housing, the electronic device further comprising a positive terminal and a negative terminal on a side of the battery holder and comprising another positive terminal and another negative terminal on a side of the housing, wherein the positive terminal and the negative terminal on the side of the battery holder are arranged side by side, the positive terminal and the negative terminal on the side of the housing are arranged side by side, the housing includes an outer case and an inner case arranged inside the outer case and provided with the guide portion, a circuit board of the electronic device is fixed to an outer surface of the inner case, the inner case is made of a resin material and includes a base portion, a first plate portion and a second plate portion that extend from the base portion in an insertion direction of the battery holder into the housing, a pair of recessed grooves is formed on an inner surface side at both ends of the second plate portion opposed to each other in the insertion direction so as to extend in the insertion direction, a pair of protrusion portions is formed in the battery holder so as to extend in the insertion direction, and the pair of recessed grooves and the pair of protrusions constitute a guide portion.

\* \* \* \* \*